United States Patent [19]

Schmidt

[11] 4,135,059
[45] Jan. 16, 1979

[54] MULTIPLE CHANNEL PER BURST TDMA MULTIPLE TRANSPONDER NETWORK

[75] Inventor: William G. Schmidt, Gaithersburg, Md.

[73] Assignee: Satellite Business Systems, McLean, Va.

[21] Appl. No.: 813,645

[22] Filed: Jul. 7, 1977

[51] Int. Cl.² .............................................. H04J 3/06
[52] U.S. Cl. .................................... 179/15 BS; 325/4
[58] Field of Search .................. 179/15 BS; 178/69.1; 325/4

[56] References Cited

U.S. PATENT DOCUMENTS

| | | | |
|---|---|---|---|
| 3,644,678 | 2/1972 | Schmidt | 179/15 BA |
| 3,649,764 | 3/1972 | Maillet | 179/15 BA |
| 3,818,453 | 6/1974 | Schmidt et al. | 179/15 BS X |
| 4,004,098 | 1/1977 | Shimasaki | 179/15 BS |

*Primary Examiner*—Thomas W. Brown
*Attorney, Agent, or Firm*—Pollock, Vande Sande & Priddy

[57] ABSTRACT

A time division multiple access (TDMA) communication system has a plurality of geographically separated stations including a first group of stations, each of which can communicate with any other station in the first group through a first transponder in a predetermined portion of a TDMA frame (intra-group traffic), and a second group of stations, each of which can communicate with any other station in the second group through a second transponder in a predetermined portion of a TDMA frame associated with the second transponder (intra-group traffic). The TDMA frames of the first and second transponders are synchronized and inter-group traffic, i.e., communications between a station in the first group and a station in the second group, takes place in another predetermined portion of each of the frames which is exclusive of the predetermined portion of both frames used for intra-group traffic. Transponder hopping is employed without requiring needless duplication of terminal equipment and, at the same time, assuring non-overlapping transmissions through the same transponder. The stations transmit in a multiple channel per burst format with fully variable demand assignment. The invention is a control method and apparatus for providing a control channel for (1) ascertaining the per-station intra-group and inter-group traffic requirements, (2) allotting each station the necessary burst position and duration (capacity), and (3) synchronizing burst length changes and movement of a station's bursts to insure non-interference with transmission of other stations.

9 Claims, 9 Drawing Figures

MULTIPLE CHANNEL PER BURST TDMA MULTIPLE TRANSPONDER NETWORK

FIELD OF THE INVENTION

The present invention relates to multi-transponder TDMA communication networks.

BACKGROUND OF THE INVENTION

Although a relatively recent addition to communication technology, time division multiple access (TDMA) has become an acceptable technique for use with transponders located in synchronous or quasi-synchronous earth orbit. Conventionally, a satelite transponder has an associated up-link frequency on which it receives from a plurality of earth stations. The transponder further has a down-link frequency on which it transmits. Time division techniques place a number of channels in a single frequency. To allow multiple stations to talk to each other through a single transponder on common up-link and down-link frequencies, proper timing is essential. To prevent garbling, the transmissions from each of the different stations must be received in time sequence at the transponder. In order to efficiently utilize the capacity of the transponder, proper timing is achieved through timing from a common marker or reference burst transmitted to each of the stations through the transponder. A periodic reference burst defines a frame, between adjacent reference bursts, which is further conceptually subdivided into a plurality of time slots. Each of the stations is allowed to transmit, in burst form, and each burst is aimed at a different slot. Thus, the frame includes the reference burst, and a plurality of slots for traffic. To make control of the network tractable, a further portion of the frame is provided for control purposes, i.e., to allow changing the slot allocations among the stations, etc.

TDMA systems can be further subdivided into single channel per burst systems and multiple channel per burst systems. In the former, time slots in the frame are usually of fixed duration and when a station needs a communication channel it must seize an unused time slot. In the latter type of system, each burst includes multiple channels and the time slots are dedicated to a particular station's bursts which may not be of fixed duration. Changing traffic among the stations is handled by changing burst (or slot) duration and, of necessity, burst position. Systems which are arranged to control changes in burst duration and position are disclosed in prior U.S. Pat. Nos. 3,644,678 (issued Feb. 22, 1972); 3,649,764 (issued Mar. 14, 1972); and 3,818,453 (issued June 18, 1974). The first two mentioned patents do not disclose multi-transponder systems. The latter patent, while disclosing how a particular station may transmit to, or receive from, multiple transponders and how burst duration and position may be varied does not disclose how the latter function can be achieved in a multi-transponder system in an orderly fashion. The present invention is directed to this end. A copending application, Ser. No. 779,874, filed on Mar. 21, 1977, relates to single channel per burst systems.

It is therefore an object of the present invention to provide for burst duration and location changes in a multiple transponder multiple channel per burst fully variable demand assignment system.

SUMMARY OF THE INVENTION

This and other objects of the invention are fulfilled in a multi-transponder TDMA network having a first transponder and a group of stations communicating with each other through said first transponder in a first TDMA frame and a second transponder and a second group of stations communicating with each other through said second transponder in a second TDMA frame; intra-group communications are confined to predetermined (but variable) portions of first and second TDMA frames which are synchronized, said portions overlap each other in time leaving other portions of both frames available for inter-group traffic. The inter-group traffic is allowed to proceed in the other portions of said frames, using transponder hopping techniques, either up-link or down-link.

A control means is provided to enable orderly changes in burst duration and position. The control means may take the form of one or more control stations, which may be co-located with one or more of the other stations. If only one control station is included it must be capable of transmitting to and receiving from each transponder. Otherwise, a control station is provided for each group of stations, in which case the control station need only have the communication facilities of any other station in the associated group. The control station or stations transmit a burst to the stations in the associated group, to perform the following functions:

1. request for data on required capacity;
2. providing new capacity assignments; and
3. providing commands to execute the new assignments.

The control station also transmits a "deaf" burst to the non-associated stations to perform the following functions:

1. inform the non-associated stations of revised (but not yet executed) channel assignments;
2. coordinate with control station(s) of other group(s);
3. provide a command channel to indicate a command to execute revised channel assignments.

This burst is "deaf" since its transmission is not monitored by the transmitting control station.

As in the aforementioned patents, transponder capacity, and hence burst duration, is allocated in increments of fixed duration or multiples thereof, which fixed duration may, for example, correspond to a voice channel. This minimum duration will be termed a channel-slot. Thus, the beginning of a burst of each station may coincide with an integral multiple of channel-slots from the frame reference. In determining required capacity the control means acquires information from each station as to its current channel-slot capacity requirements. After determining a re-allocation of capacity among stations in the network, in accordance with an appropriate algorithm, such as one disclosed in one of the cited patents, each station is informed of new channel-slot assignments. After verifying that this data is properly received, an execute command is transmitted to all stations. Where there exists a control station per group of stations, each control station handles channel-slot allocations of the intra- and inter-group capacity for associated stations. This is accomplished by a burst transmission in the intra-group portion of the associated frame which is received by all associated stations. The same control station then transmits at least a portion of this information in the inter-group portion of the frame for reception by non-associated stations. In this fashion, all stations, that is, stations in both groups, are informed about new channel-slot assignments or burst duration and position changes. If only a single control station is provided it must perform the functions outlined for both groups of stations

BRIEF DESCRIPTION OF THE DRAWINGS

The present invention will now be disclosed to allow those skilled in the art to practice the same in the following portion of this specification when taken in conjunction with the attached drawings in which.

DETAILED DESCRIPTION OF THE INVENTION

Inasmuch as the previously referred-to prior art U.S. Pat. Nos. 3,644,678 and 3,649,764 provide a disclosure of how, in a single transponder network, channel-slot reallocation functions can be provided, that disclosure will not be repeated herein, and the disclosure of those patents is incorporated herein by reference. The present invention is directed at a method and apparatus for providing the foregoing functions, in an orderly manner, in a multi-transponder network wherein some of the stations must, of necessity, transmit "deaf" at times.

Figure 1:
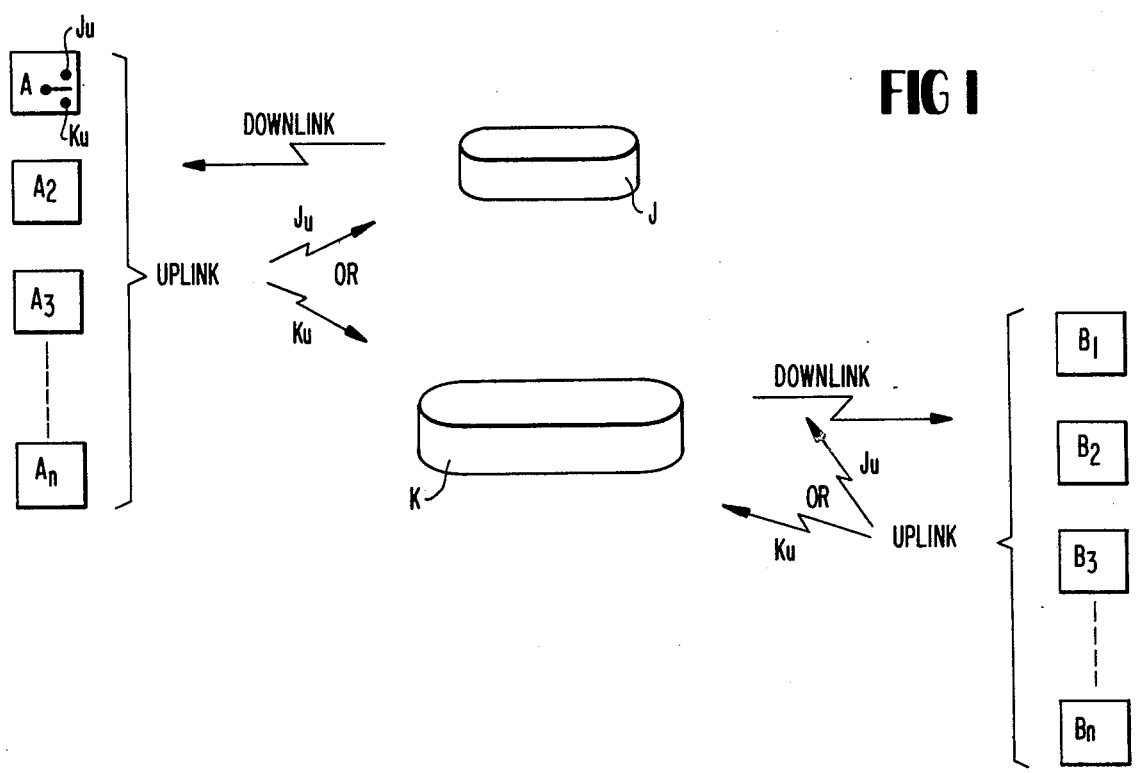
FIG. 1 is a schematic showing of a multi-transponder network with two groups of stations.

More particularly, FIG. 1 is a schematic representation of such a network including transponders J and K. A first group of stations, identified by reference characters $A_1$-$A_n$, can normally communicate among each other, in a TDMA format through the transponder J employing up-links and down-links associated with that transponder. A second group of stations, identified by reference characters $B_1$-$B_n$, can normally communicate among themselves with a second transponder K, employing up-links and down-links associated with that transponder. As described in copending application Ser. No. 779,874, bi-directional communication can be enabled between a station in the first group and a station in the second group by employing transponder hopping. That is, for example, in up-link hopping, the first group stations can transmit not only to transponder J (on up-link $J_u$) but can also transmit to transponder K (on the corresponding up-link $K_u$). Likewise, second group stations can transmit to first group stations by employing the up-link to transponder J ($J_u$) in addition to the up-link to transponder K ($K_u$). The mentioned application discloses method and apparatus for providing orderly communications employing up-link or down-link hopping with a network such as the one shown in FIG. 1, employing a single channel per burst format. To implement the disclosed technique, all the stations in the network are capable of transmitting on either up-link, $J_u$ or $K_u$. A first portion of each frame (associated with each transponder) is set aside for intra-group communications, that is, first group stations transmit on the up-link $J_u$ and second group stations transmit on the up-link $K_u$. A second portion of each of the frames is set aside for inter-group communication. To effect inter-group communication, employing up-link hopping, a switch is provided at each of the stations having two positions. In one position of the switch intra-group communications are carried out, and in the second position of the switch, inter-group communications are carried out. This switch may be located in the up-link converter to switch in one of two different oscillators for selecting the appropriate up-link. In the alternative, each station may have two up-link converters with the switch provided to select between the appropriate up-link converter. By synchronizing operation of the switches in all the stations in the network, when the first group stations are transmitting to transponder K (corresponding to inter-group communication) the second group stations are transmitting to transponder J, and thus the objective of TDMA communication is realized, there are non-overlapping bursts received at the transponder for re-transmission to the stations in the network.

The particular problems solved in the apparatus and method disclosed in the co-pending application related particularly to signalling and control, some of which are common to single and multiple channel per burst operations, while other problems are unique to single channel per burst operations. The present application is directed to the solution of problems unique to multiple channel per burst operations.

From the preceding discussion, and a review of FIG. 1, those skilled in the art will be capable of varying the apparatus in FIG. 1 to employ down-link hopping. That merely requires eliminating the ability of the first group stations to transmit to either transponder J or K, and instead enabling the first group stations to receive, from transponder K at selected times in the frame in addition to receiving from transponder J at other portions of the frame. Correspondingly, second group stations are limited to transmitting to transponder K, but during selected times in the frame, can receive from transponder J. A switch at each of the stations, similar to the switch discussed above, is provided for selecting the transponder to which the stations are responsive.

The particular problems to which the present invention is directed are the control functions required for channel re-allocation in a multiple channel per burst format; specifically, the need to:

1. collect data on channel-slots in use and thus to be in a position to determine numbers of unused channels available for reassignment;
2. provide the station in the network with new channel-slot assignments, and their positions in the frames;
3. provide commands to execute the new assignments.

These functions have to be performed, notwithstanding the fact that some stations may, of necessity, be transmitting "deaf" inasmuch as they may not be capable of receiving their transmission, at least for certain portions of the frames.

Figure 2:
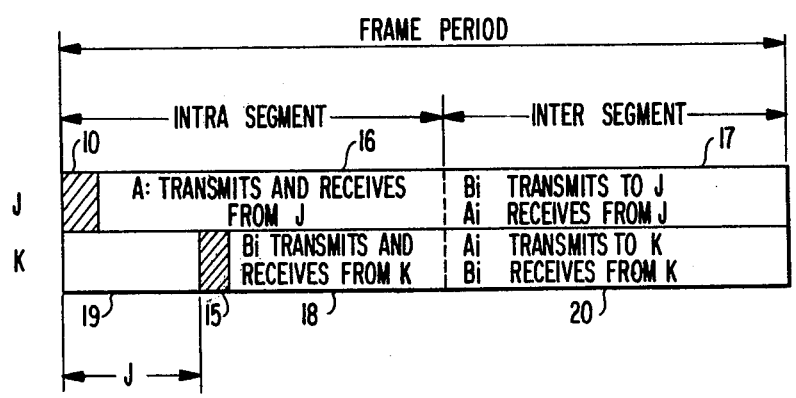
FIGS. 2-6 illustrate the TDMA frames of the transponders shown in FIG. 1.

With the preceding discussion in mind, FIG. 2 represents the frames J and K, and more particularly illustrates the transponder hopping format. The reference characters identify the transponder (J or K) with which the frame is associated. That is, the frame J includes a reference burst 10, transmitted by a station of either the first of the second groups which corresponds to the reference stations transmitting the time marker on which the frames J and K are based. As disclosed in the co-pending application, it is preferable for a single station to transmit the reference marker in both frames. The frame further includes the intra-group segment in which first group stations transmit to and receive from transponder J. Correspondingly, the frame K includes a reference burst 15, displaced from the reference burst 10 by a predetermined period. The frame K also includes an intra-group segment as is shown in FIG. 2 and comprises portions 18 and 19 of the frame K. Although it is essential that a reference marker or burst be included in each frame it is not essential to the invention that it be included in the intra-segment of the frame, and if desired, could be included in the inter-group segment of the frame so long as the reference burst is included in the same portion of each of the two frames to insure that each of the stations receives the reference burst. Since the reference burst 10 and 15 in the frames J and K are preferably displaced from one another, the intra segment of frame K is divided into two portions, such as the portions 18 and 19 as illustrated. Each of the frames J and K also includes an inter-group segment in which stations in the second group transmit to transponder J, for reception by stations in the first group. Likewise, transponder K includes an inter-group segment in which first group stations transmit to transponder K for reception by second group stations.

Figure 3:
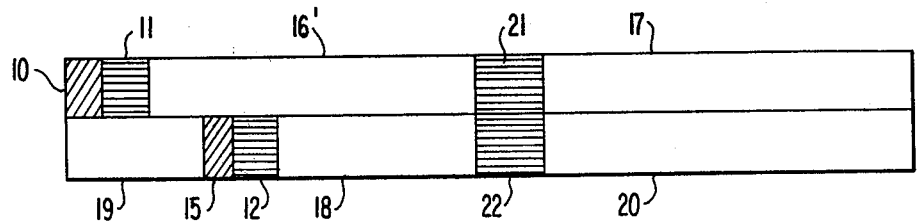

For purposes of channel re-allocation, it is desirable that one station in each group be designated the control station, and this station need not be the station transmitting the reference burst. As disclosed in the aforementioned patents, the control station periodically collects information on the number of channels in use, computes desirable changes to maximize channel usage, informs the other stations in the group of the revised channel assignments, and provides a command for execution of the channel assignment changes. As is also disclosed in the aforementioned patents, burst duration is always an integral number of channel-slots, wherein each channel-slot may comprise a predetermined time period, such as an integral number of bits in the bit stream. To perform these functions, the control station in each group must transmit a control burst. Thus, for frame J, FIG. 3 illustrates that a first group control station transmits a control burst in the frame portion 11, and the second group control station transmits a control burst in the frame portion 12. Inasmuch as these bursts are included in the intra-group segment, they are received only by stations in the same group as the transmitting station. Thus, for example, if station $A_1$ is designated as the control station, its burst in the portion 11 will be received by all other first group stations. This provides the necessary communication paths for some of the functions that have to be performed. However, inasmuch as the control burst in the portion 11 is not received by the second group stations, it is essential that station $A_1$ have a means of communicating with second group stations. To this end, station $A_1$ is also capable of transmitting a control burst in a frame portion 22 in the inter segment of the frame K, and this burst is received by the second group stations. Likewise, if the station $B_1$ is designated as the control station in the second group stations, it transmits a control burst in the frame portion 12 in the intra segment of frame K, and a control burst in the frame portion 21 in the inter segment of frame J. The burst in the frame portion 12 is received by all second group stations, and the burst in the frame portion 21 is received by all first group stations.

As will be described below, the referred-to frame portions 11, 12, 21 and 22 may carry bursts other than the control bursts described. In particular, replies from other stations may be transmitted in these frame portions as well. That is, the request for data transmitted by station $A_1$ may result in replies from stations $A_2 \ldots A_n$. These replies are multiplexed, in known fashion, into the frame portion 11. Similar remarks hold for the frame portions 12, 21 and 22.

Figure 4:
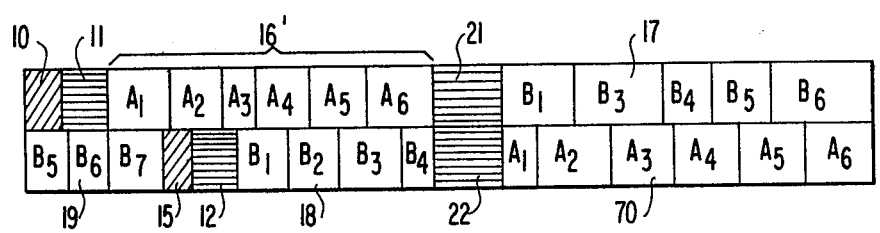

In accordance with the foregoing, then, FIG. 4 illustrates a typical makeup of the frames J and K at any particular instant in time. Frame J thus includes the reference burst 10, the station $A_1$'s control burst in portion 11, and traffic from each of stations $A_1-A_6$, for reception at all other first group stations. Also transmitted in frame J is station $B_1$'s control burst in portion 21 as well as traffic from stations $B_1$, $B_3-B_6$ for reception by all first group stations. Correspondingly, frame K includes, as is illustrated in FIG. 4, traffic from stations $B_5-B_7$ for reception at other second group stations, the reference burst 15, transmitted preferably by the same station that transmits reference burst 10, station $B_1$'s control burst in portion 12 as well as traffic transmitted by stations $B_1-B_4$, all for reception by second group stations. Also included in this frame K is station $A_1$'s control burst in portion 22, as well as traffic from stations $A_1-A_6$, for reception by all second group stations.

Inasmuch as the prior art includes disclosures of methods and apparatus for call signalling purposes, i.e., the functions necessary for obtaining channel capacity for go and return links required by any call, as well as methods and apparatus for changing burst position and duration, in single transponder networks, the methods and apparatus to perform these functions will not be addressed herein. The particular problems to be overcome by the methods and apparatus of this invention relate to control of burst position and duration in the inter-group segment of the frames of a multi-transponder network. More particularly, the referenced U.S. Pat. Nos. 3,644,678 and 3,649,764 contain teachings to enable those skilled in the art to provide for burst position and duration changes in a single transponder network, and the same methods and apparatus can be employed in the intra-group portion of the frames of a multi-transponder network.

Figure 7:
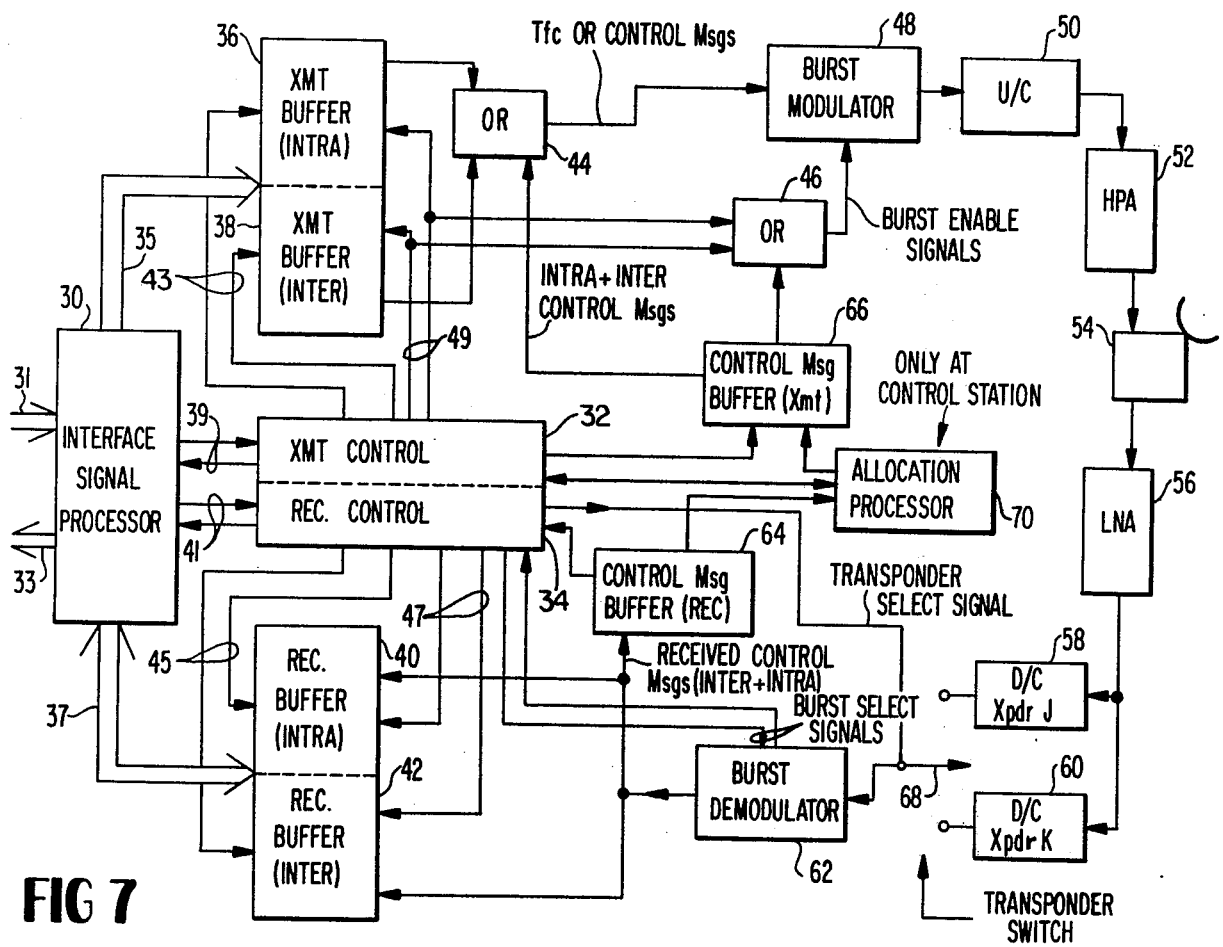
FIGS. 7-9 are block diagrams of suitable earth stations, FIG. 7 repesenting a combined traffic and control station, FIG. 8 representing a stand-alone control station and FIG. 9 representing a typical traffic station.

FIG. 7 illustrates a block diagram of apparatus which is located at a typical station to perform the functions outlined above. The showing of FIG. 7 represents a typical station and a co-located control station. To illustrate the point about selecting either up-link or down-link hopping, FIG. 7 shows an earth station suitable for use with down-link hopping.

An interface signal processor 30 accepts signalling and traffic data on an input bus 31, and provides received signalling and traffic data to a terrestrial network via output bus 33. The interface signal processor 30 can, for instance, provide digitizing functions where the traffic requires those functions. The interface signal processor can also separate signalling and traffic. Traffic is provided, over a bus 35, to a transmit buffer 36-38. As shown in FIG. 7, by the dotted horizontal line, this apparatus may actually comprise a transmit buffer 36, adapted for intra-group transmission and a separate transmit buffer 38 adapted for inter-group communications. The buffer or buffers are enabled to receive data for storage purposes via control lines 43 from a transmit control 32. A single buffer may be substituted for the two buffers illustrated in FIG. 7 provided there are addressing arrangments for segregating the traffic destined for channels in the intra-group portion of the frame from the traffic destined for the inter-group channels of the frame. Signalling information passes between the interface signal processor 30 and a transmit control 32 via control lines 39. The buffers 36-38 have output lines respectively to an OR gate 44 which drives burst modulator 48. The output of burst modulator 48 is coupled to an up/converter 50, which in turn drives high powered amplifier 52 which is coupled to antenna 54. Signals received over antenna 54 are coupled to low noise amplifier 56 which is coupled, in turn, to down converters 58 and 60. One down converter, for example, down converter 58, enables the station to receive from transponder J, and the other down converter enables the station to receive from transponder K. The outputs of the down converters 58 and 60 are provided to a transponder switch 68, the output of which drives burst demodulator 62. The demodulator signals are provided to a receive buffer 40 (intra) a receive buffer 42 (inter) and a control message buffer receiver 64. As in the case with the transmit buffers 36-38, the receive buffer 40-42 can comprise two separate buffers, indicated by the horizontal dashed line. On the other hand, with proper addressing techniques, a single buffer will suffice. The buffers 40-42 are allowed to receive in response to signals coupled from a receive control 34 over control lines 47. The buffers 40-42 provide received traffic data over a bus 37 to the interface signal processor 30, which in turn couples the data to a terrestrial network over its output bus 33. For those channels where, for example, the interface signal processor provides digitizing functions, the interface signal processor 30 correspondingly includes digital to analog conversion apparatus so that the output provided on bus 33 is analog in form. The readout of buffers 40-42 is controlled over control lines 45 from receive control 34. Further signalling information passes between the receive control 34 and the interface signal processor 30 over control lines 41.

The specifics regarding the signal processor 30, transmit buffers 36-38 receive buffers 40-42 as well as transmit control 32 and receive control 34, modulator 48, demodulator 62, as well as the other apparatus in the signal chain associated with the antenna 54, are well known to those skilled in the art and will therefore not be further disclosed. The present invention deals with the control of this apparatus so as to permit multi-transponder multiple channel per burst operations.

The control and traffic station, in addition to the foregoing apparatus, includes an allocation processor 70. The allocation processor receives, from the control message buffer receiver 64 control messages from the various stations. The allocation processor 70 provides control message buffer transmitter 66 with control messages which forms the control burst illustrated in FIG. 4. The allocation processor 70 also communicates with the transmit control 32.

The control and traffic station shown in FIG. 7 is a station for a system which employs down-link hopping, as implied by the presence of the transponder switch 68 selecting between one of two down-converters 68 or 60. As mentioned hereinabove, up-link hopping can also be employed. In the case of up-link hopping, only a single down-link converter is provided and switch 68 is eliminated. Rather, a pair of up-link converters are provided with the transponder switch selecting between one of the two up-link converters.

Figure 8:
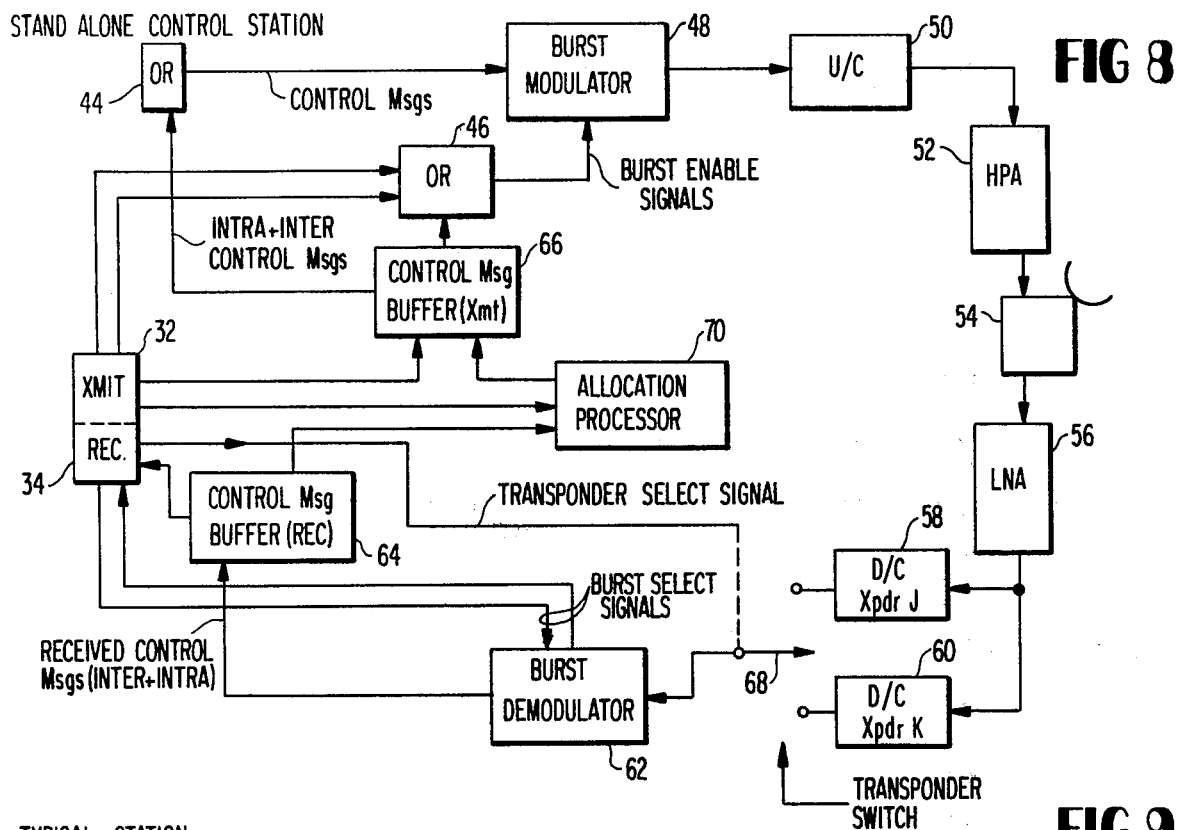
Figure 9:
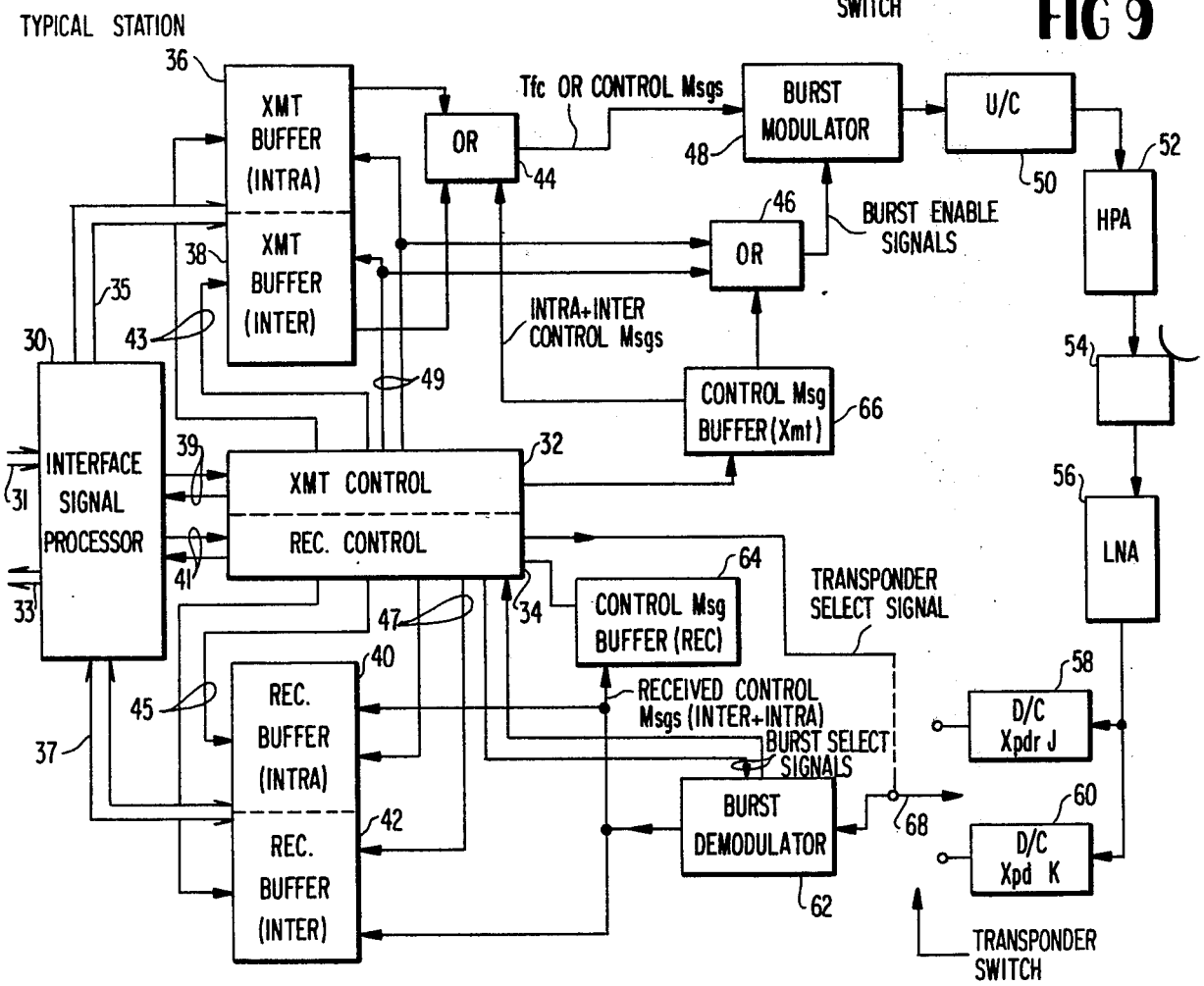

The control function can be provided by a control station, one in each group, which can either be combined with one of the other stations in the group, or can be a separate stand-alone unit as shown in FIG. 8. On the other hand, a single control station, again either a stand-alone or combined with another station, can be provided to control both groups. Such common control station would, however, require an up-converter and down-converter for each transponder served. Furthermore, it is also preferable to displace the control bursts transmitted by such a common control station so that they are not simultaneously transmitted to both transponders. This requires offsetting in time the control bursts aimed at different transponders, and therefore requires modification of the frame format shown in FIGS. 3-4. A typical traffic station which does not perform control functions is shown in FIG. 9. Since FIG. 9 repeats the identical apparatus of FIG. 7, no further discussion is deemed necessary.

To demonstrate operation of the invention, consider the network of FIG. 1, at a first time in which there are eight stations, four in a first group $A_1$-$A_4$, and four in a second group $B_1$-$B_4$, operating with two transponders J and K and assume each transponder has a 1,000 channel capacity. At a first instant, the traffic matrix is as shown in Table I, reproduced below.

TABLE I

|       | $A_1$ | $A_2$ | $A_3$ | $A_4$ | $B_1$ | $B_2$ | $B_3$ | $B_4$ |
|-------|-----|-----|-----|-----|-----|-----|-----|-----|
| $A_1$ | —   | 150 | 50  | 75  | 10  | 10  | 10  | 10  |
| $A_2$ | 150 | —   | 25  | 25  | 10  | 5   | 10  | 5   |
| $A_3$ | 50  | 25  | —   | 25  | 10  | 10  | 5   | 20  |
| $A_4$ | 75  | 25  | 25  | —   | 10  | 5   | 20  | 10  |
| $B_1$ | 10  | 10  | 10  | 10  | —   | 60  | 50  | 100 |
| $B_2$ | 10  | 5   | 10  | 5   | 60  | —   | 30  | 100 |
| $B_3$ | 10  | 10  | 5   | 20  | 50  | 30  | —   | 20  |
| $B_4$ | 10  | 5   | 20  | 10  | 100 | 100 | 20  | —   |

Figure 5:
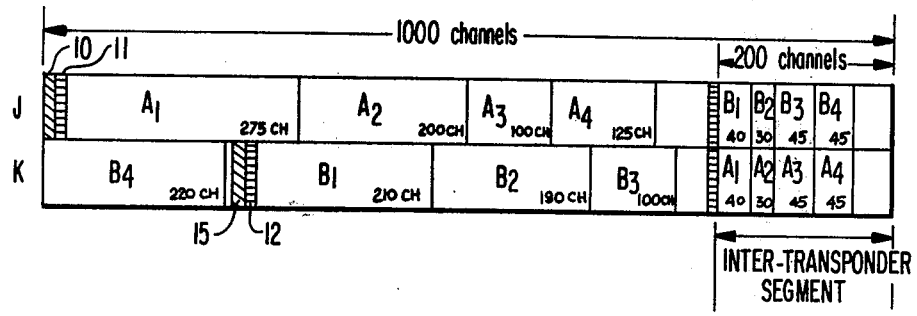

The inter-transponder segment for each transponder is equal in capacity and is set at 200 channels, leaving 800 channels for intra-transponder traffic. The particular frame formats are shown in FIG. 5. Assume, as we have discussed, that a control station is provided for each group, $A_1$ in the first group and $B_1$ in the second group. In order to re-allocate channel capacity, the control burst from each control station requests the stations in the associated group to transmit their suggested new capacity allocations for both the intra- and inter-transponder operations. These control bursts, one for $A_1$ and another for $B_1$, need only be transmitted to stations in the associated group and therefore this control message need not be repeated in the inter frame segment. Repetition may, however, be desirable to inform the other control station that a request for channel usage has actually been transmitted. The stations reply in their control message areas of their intra-transponder bursts, i.e., in frame portion 11, or 12, depending upon in which group a station is. The replies may simply correspond to station totals, but can also indicate suggested link totals.

Likewise, the station replies need only be transmitted to the associated control station (intra segment only). Repetition may, however, be desirable to allow the non-associated control station to monitor the replies and perhaps enable the non-associated control station to check operation of its counterpart. This information, at stations $A_1$ and $B_1$, is received at the control message buffer receiver 64 and provided to the allocation processor 70 at each of the stations. Employing a re-allocation algorithm resident in the control program of allocation processor 70, new capacity allocations are determined. These allocation capacities are transmitted, through the control message buffer 66, at each of the control stations, in both the intra- and inter-segment control bursts of the control station, and in this fashion, is made available to not only the stations in the associated group, but the stations in the other group. For illustration purposes, Table II below lists the new channel allocations.

TABLE II

|       | A₁  | A₂  | A₃ | A₄ | B₁ | B₂ | B₃ | B₄ |
|-------|-----|-----|----|----|----|----|----|----|
| A₁    | —   | 170 | 60 | 65 | 15 | 10 | 10 | 15 |
| A₂    | 170 | —   | 30 | 30 | 15 | 5  | 10 | 5  |
| A₃    | 60  | 30  | —  | 25 | 10 | 15 | 5  | 20 |
| A₄    | 65  | 30  | 25 | —  | 10 | 5  | 15 | 10 |
| B₁    | 15  | 15  | 10 | 10 | —  | 65 | 55 | 90 |
| B₂    | 10  | 5   | 15 | 5  | 65 | —  | 45 | 90 |
| B₃    | 10  | 10  | 5  | 15 | 55 | 56 | —  | 25 |
| B₄    | 15  | 5   | 20 | 10 | 90 | 90 | 25 | —  |

Figure 6:
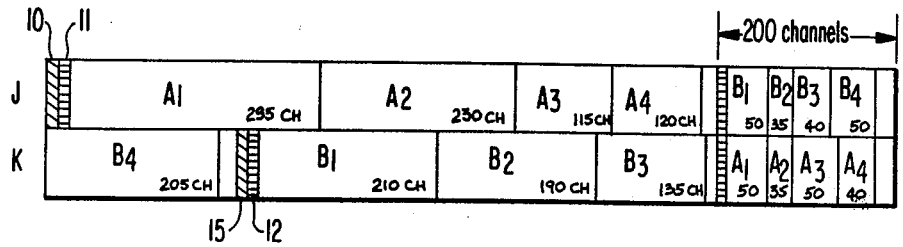

As yet, this merely is information which will be employed at a future time; in other words, while the stations receive their new allocations they are still operating on the old allocation of FIG. 5. The allocation processor 70 provides time for the stations to either acknowledge proper receipt of the new capacity allocations or to notify the associated control station that the new allocations received are, for some reason, incorrect. Any of a number of well-known acknowledgement or verification procedures may be used. For example, each control station may allow a fixed period ($T_c$) within which the associated stations may report a problem with their receipt of new allocations. If no station reports a problem within time $T_c$, it is assumed that the allocations have been correctly received. After further coordination between the control stations $A_1$ and $B_1$, each station transmits an execute command to the stations in the associated group in the intra-transponder burst. Since the control stations may communicate with each other through the inter-transponder segments this coordination is readily achieved. Upon receipt of this command, and employing a prearranged common synchronization procedure, such as procedures known in the art, all stations shift their inter- and intra-transponder burst positions and adjust their internal memories to correspond to the new locations for their burst as well as other bursts of interest in the two frames. New frame formats corresponding to the traffic matrix of Table II is shown in FIG. 6.

Thus, the control stations have, in accordance with the preceding, performed the functions of reallocating channel capacity, informing all stations in the network, both those in the associated group, and those in the other group, of these new allocations and commanded the stations in the network to execute the new commands.

The preceding discussion has assumed that the transition time between inter- and intra-transponder operations is fixed. It may, however, be desirable to adapt the percentage of inter-transponder capacity and intra-transponder capacity in accordance with changing traffic. This can be accomplished by setting the hopping times, that is, the time in the frame when the switch 68 is operated, on the basis of another command from the control station. In this fashion, the percentage of transponder capacity employed in intra- and inter-transponder operations can be varied to suit varying traffic.

What is claimed is:

1. A demand assigned multi-transponder TDMA system including:
   first and second transponders in quasi-synchronous earth orbit,
   a first group of associated stations intra-communicating through said first transponder having a TDMA frame, a second group of associated stations intra-communicating through said second transponder having a TDMA frame wherein stations in said first group can inter-communicate with stations in said second group and stations in said second group can inter-communicate with stations in said first group, said system further including:
   means at one station effective for establishing a frame reference for both said first and second transponder TDMA frames, to thereby synchronize said frames,
   synchronized transponder hopping means at all of said stations enabling communication between stations of said first and second groups, through either said first or second transponder whereby intra group communications are carried on in a first portion of said first and second TDMA frames and inter group communications are carried on in portions of said frames exclusive of said first portion, and
   control means for enabling orderly changes in burst duration and position of bursts transmitted by all said stations, said control means including means for transmitting burst position and duration change orders through said transponders to all said stations.

2. The apparatus of claim 1 wherein said transponder hopping means includes switching means to switch the associated station's transmissions to either said first or second transponder.

3. The apparatus of claim 1 wherein said transponder hopping means includes switching means to switch the associated station's receptions from either said first or second transponder.

4. the apparatus of claim 1 wherein said control means includes:
   first and second control stations associated respectively with said first and second groups of stations, each said control station having synchronized transponder hopping means,
   each said control station including means for transmittting to all stations of said system controls for effecting changing burst duration and positions of bursts of stations in the associated group.

5. The apparatus of claim 4 wherein each said control station includes means to transmit a request for information, from each associated station as to the number of channels in use.

6. The apparatus of claim 4 wherein each said control station includes means responsive to information from associated stations as to number of channels in use to determine new burst duration and position assignments for each said associated station.

7. The apparatus of claim 6 wherein said control stations have means to determine burst duration and position for associated station's transmissions in both portions of said frames.

8. The apparatus of claim 4 wherein each said control station includes means to transmit new burst duration and position information to associated and non-associated stations.

9. The apparatus of claim 4 wherein each said control station includes means to transmit to each associated station a command to execute burst duration and position information previously transmitted.

* * * * *